(12) United States Patent
Ignatchenko et al.

(10) Patent No.: US 11,176,546 B2
(45) Date of Patent: Nov. 16, 2021

(54) SYSTEMS, METHODS AND APPARATUSES FOR SECURELY STORING AND PROVIDING PAYMENT INFORMATION

(71) Applicant: OLogN Technologies AG, Triesen/FL (LI)

(72) Inventors: Sergey Ignatchenko, Innsbruck (AT); Dmytro Ivanchykhin, Kiev (UA)

(73) Assignee: OLogN Technologies AG, Triesen/FL (LI)

( * ) Notice: Subject to any disclaimer, the term of this patent is extended or adjusted under 35 U.S.C. 154(b) by 465 days.

(21) Appl. No.: 14/213,912

(22) Filed: Mar. 14, 2014

(65) Prior Publication Data

US 2014/0279562 A1 Sep. 18, 2014

Related U.S. Application Data

(60) Provisional application No. 61/789,618, filed on Mar. 15, 2013.

(51) Int. Cl.
*G06Q 20/00* (2012.01)
*G06Q 20/38* (2012.01)
(Continued)

(52) U.S. Cl.
CPC ......... *G06Q 20/3829* (2013.01); *G06F 21/57* (2013.01); *G06F 21/606* (2013.01);
(Continued)

(58) Field of Classification Search
CPC ........... G06Q 2220/00; G06Q 2220/10; G06Q 2220/16; G06Q 20/3829; G06Q 20/351;
(Continued)

(56) References Cited

U.S. PATENT DOCUMENTS 5,134,700 A 7/1992 Eyer et al.
5,500,897 A 3/1996 Hartman, Jr.
(Continued)

FOREIGN PATENT DOCUMENTS

EP 1 612 670 A2 1/2006
EP 2 045 753 A1 4/2009
(Continued)

OTHER PUBLICATIONS

Bare, "Attestation and Trusted Computing," CSEP 590: Practical Aspects of Modern Cryptography, 1-9 (2006).
(Continued)

*Primary Examiner* — Dante Ravetti
(74) *Attorney, Agent, or Firm* — Arnold & Porter Kaye Scholer

(57) ABSTRACT

The systems, methods and apparatuses described herein provide a virtual integrated circuit card (ICC). In one aspect, a method of creating a virtual ICC may be provided. The method may comprise obtaining executable code configured to run on a user device to facilitate financial transactions, preparing a first encryption key usable by the executable code, receiving a second encryption key associated with the user device, forming a virtual ICC comprising the executable code and the first encryption key, and encrypting the virtual ICC with the second encryption key. In another aspect, a virtual ICC may be embodied on a non-transitory computer-readable medium. The virtual ICC may comprise executable code configured to run on a user device to facilitate financial transactions and a first encryption key usable by the executable code. The virtual ICC may be encrypted using a second encryption key associated with the user device.

18 Claims, 8 Drawing Sheets

(51) Int. Cl.
*G06F 21/60* (2013.01)
*G06F 21/74* (2013.01)
*G06Q 20/34* (2012.01)
*G06F 21/57* (2013.01)

(52) U.S. Cl.
CPC ........... *G06F 21/74* (2013.01); *G06Q 20/351* (2013.01); *G06Q 20/3823* (2013.01); *G06Q 20/3825* (2013.01)

(58) Field of Classification Search
CPC ............ G06Q 20/3823; G06Q 20/3825; G06F 21/606; G06F 21/74; G06F 21/57
USPC ................. 705/16, 21, 59; 380/44, 262, 278
See application file for complete search history.

(56) References Cited

U.S. PATENT DOCUMENTS

| | | | |
|---|---|---|---|
| 5,615,263 | A | 3/1997 | Takahashi |
| 5,677,955 | A | 10/1997 | Doggett et al. |
| 5,787,172 | A | 7/1998 | Arnold |
| 5,815,571 | A | 9/1998 | Finley |
| 5,832,206 | A | 11/1998 | De Jesus et al. |
| 5,896,499 | A | 4/1999 | McKelvey |
| 5,978,484 | A | 11/1999 | Apperson et al. |
| 6,029,245 | A | 2/2000 | Scanlan |
| 6,088,684 | A | 7/2000 | Custy et al. |
| 6,091,823 | A | 7/2000 | Hosomi et al. |
| 6,092,202 | A | 7/2000 | Veil et al. |
| 6,163,771 | A * | 12/2000 | Walker ................... G06Q 20/04 705/18 |
| 6,247,133 | B1 | 6/2001 | Palage et al. |
| 6,327,578 | B1 | 12/2001 | Linehan |
| 6,385,727 | B1 | 5/2002 | Cassagnol et al. |
| 6,581,841 | B1 | 6/2003 | Christoffersen |
| 6,587,880 | B1 | 7/2003 | Saigo et al. |
| 6,658,394 | B1 | 12/2003 | Khaishgi et al. |
| 6,862,641 | B1 | 3/2005 | Strongin et al. |
| 7,065,654 | B1 | 6/2006 | Gulick et al. |
| 7,100,049 | B2 | 8/2006 | Gasparini et al. |
| 7,114,177 | B2 | 9/2006 | Rosenberg et al. |
| 7,124,302 | B2 | 10/2006 | Ginter et al. |
| 7,201,659 | B2 | 4/2007 | Nakayama et al. |
| 7,337,314 | B2 | 2/2008 | Hussain et al. |
| 7,350,194 | B1 | 3/2008 | Alpern |
| 7,363,493 | B2 | 4/2008 | Dotan |
| 7,574,479 | B2 | 8/2009 | Morris et al. |
| 7,587,611 | B2 | 9/2009 | Johnson et al. |
| 7,636,858 | B2 | 12/2009 | Khan et al. |
| 7,681,046 | B1 | 3/2010 | Morgan et al. |
| 7,739,512 | B2 | 6/2010 | Hawkes |
| 7,774,619 | B2 | 8/2010 | Paaske et al. |
| 7,779,252 | B2 | 8/2010 | O'Brien et al. |
| 7,797,544 | B2 | 9/2010 | Dillaway et al. |
| 7,853,531 | B2 | 12/2010 | Lao et al. |
| 7,861,097 | B2 | 12/2010 | Smeets et al. |
| 7,882,221 | B2 | 2/2011 | Sailer et al. |
| 7,940,932 | B2 | 5/2011 | Paksoy et al. |
| 7,979,696 | B2 | 7/2011 | Kim et al. |
| 8,056,120 | B2 | 11/2011 | Kusakari |
| 8,112,787 | B2 | 2/2012 | Buer |
| 8,386,785 | B2 | 2/2013 | Kim et al. |
| 8,561,083 | B2 | 10/2013 | Bender |
| 8,635,535 | B2 | 1/2014 | Shaty |
| 8,635,536 | B2 | 1/2014 | Shaty |
| 8,656,482 | B1 | 2/2014 | Tosa et al. |
| 8,856,868 | B2 | 10/2014 | Ikegami |
| 8,949,929 | B2 | 2/2015 | Kelly et al. |
| 8,959,183 | B2 | 2/2015 | Zeller et al. |
| 9,015,703 | B2 | 4/2015 | Fitzgerald et al. |
| 2002/0062438 | A1 | 5/2002 | Asay et al. |
| 2002/0183056 | A1 | 12/2002 | Lundblade et al. |
| 2003/0051169 | A1 | 3/2003 | Sprigg et al. |
| 2003/0105950 | A1 | 6/2003 | Hirano et al. |
| 2004/0010565 | A1 | 1/2004 | Hong et al. |
| 2005/0005161 | A1 | 1/2005 | Baldwin |
| 2005/0177716 | A1 * | 8/2005 | Ginter ..................... G06F 21/10 713/157 |
| 2005/0268103 | A1 | 12/2005 | Camenisch |
| 2006/0010447 | A1 | 1/2006 | Egashira et al. |
| 2006/0047959 | A1 | 3/2006 | Morais |
| 2006/0093149 | A1 | 5/2006 | Zhu et al. |
| 2006/0101408 | A1 | 5/2006 | Kotamarthi et al. |
| 2006/0107268 | A1 | 5/2006 | Chrabieh |
| 2006/0117177 | A1 | 6/2006 | Buer |
| 2006/0168663 | A1 | 7/2006 | Viljoen et al. |
| 2006/0259790 | A1 | 11/2006 | Asokan et al. |
| 2006/0277477 | A1 | 12/2006 | Christenson |
| 2007/0226807 | A1 | 9/2007 | Ginter et al. |
| 2007/0240230 | A1 | 10/2007 | O'Connell et al. |
| 2008/0155540 | A1 | 6/2008 | Mock et al. |
| 2008/0208758 | A1 | 8/2008 | Spiker et al. |
| 2008/0270786 | A1 | 10/2008 | Brickell et al. |
| 2008/0306876 | A1 | 12/2008 | Horvath et al. |
| 2008/0316357 | A1 | 12/2008 | Achari et al. |
| 2009/0072032 | A1 | 3/2009 | Cardone et al. |
| 2009/0089796 | A1 | 4/2009 | Bender et al. |
| 2009/0132812 | A1 | 5/2009 | Schibuk |
| 2009/0165141 | A1 * | 6/2009 | Kakehi ................... G06F 21/10 726/26 |
| 2009/0172329 | A1 | 7/2009 | Paver et al. |
| 2009/0172411 | A1 | 7/2009 | Kershaw et al. |
| 2009/0210705 | A1 | 8/2009 | Chen |
| 2009/0254986 | A1 | 10/2009 | Harris et al. |
| 2009/0271618 | A1 | 10/2009 | Camenisch et al. |
| 2009/0300263 | A1 | 12/2009 | Devine et al. |
| 2009/0300348 | A1 | 12/2009 | Aciicmez et al. |
| 2009/0313468 | A1 | 12/2009 | Hazlewood et al. |
| 2009/0320048 | A1 | 12/2009 | Watt et al. |
| 2010/0031047 | A1 | 2/2010 | Coker, II et al. |
| 2010/0076836 | A1 * | 3/2010 | Giordano ............... G06Q 20/20 705/14.38 |
| 2010/0145854 | A1 | 6/2010 | Messerges et al. |
| 2010/0192230 | A1 | 7/2010 | Steeves et al. |
| 2010/0269179 | A1 | 10/2010 | Fahrny |
| 2010/0293099 | A1 | 11/2010 | Pauker et al. |
| 2011/0029771 | A1 | 2/2011 | Mehta et al. |
| 2011/0087887 | A1 | 4/2011 | Luft et al. |
| 2012/0072346 | A1 | 3/2012 | Barkan Daynovsky et al. |
| 2012/0137117 | A1 | 5/2012 | Bosch et al. |
| 2012/0191575 | A1 | 7/2012 | Vilke et al. |
| 2012/0216041 | A1 * | 8/2012 | Naono ................... H04L 9/0894 713/171 |
| 2012/0240194 | A1 | 9/2012 | Nack Ngue |
| 2013/0047034 | A1 * | 2/2013 | Salomon ................. H04W 4/00 714/18 |
| 2013/0055347 | A1 | 2/2013 | Chawla et al. |
| 2013/0124415 | A1 | 5/2013 | Mardikar |
| 2013/0133055 | A1 | 5/2013 | Ali et al. |
| 2013/0232339 | A1 | 9/2013 | Ignatchenko et al. |
| 2013/0238786 | A1 | 9/2013 | Khesin |
| 2013/0262891 | A1 | 10/2013 | Gudlavenkatasiva et al. |
| 2013/0275306 | A1 | 10/2013 | Ignatchenko et al. |
| 2013/0276064 | A1 | 10/2013 | Ignatchenko et al. |
| 2013/0283353 | A1 | 10/2013 | Ignatchenko et al. |
| 2013/0339742 | A1 | 12/2013 | Ignatchenko et al. |
| 2013/0346747 | A1 | 12/2013 | Ignatchenko et al. |
| 2013/0346760 | A1 | 12/2013 | Ignatchenko |
| 2014/0096182 | A1 | 4/2014 | Smith |
| 2014/0096191 | A1 | 4/2014 | Saita |
| 2014/0143538 | A1 | 5/2014 | Lindteigen |
| 2014/0196127 | A1 | 7/2014 | Smeets et al. |
| 2014/0279562 | A1 | 9/2014 | Ignatchenko et al. |
| 2014/0281500 | A1 | 9/2014 | Ignatchenko |
| 2014/0281560 | A1 | 9/2014 | Ignatchenko et al. |
| 2014/0281587 | A1 | 9/2014 | Ignatchenko |
| 2014/0282543 | A1 | 9/2014 | Ignatchenko et al. |
| 2015/0039891 | A1 | 2/2015 | Ignatchenko |
| 2015/0089244 | A1 | 3/2015 | Roth et al. |

(56) References Cited

U.S. PATENT DOCUMENTS

2016/0366139 A1   12/2016  Ignatchenko et al.
2019/0081933 A1    3/2019  Ignatchenko et al.

FOREIGN PATENT DOCUMENTS

| | | |
|---|---|---|
| EP | 2 107 486 A2 | 10/2009 |
| EP | 2 113 855 A1 | 11/2009 |
| EP | 2 278 514 | 1/2011 |
| WO | 2001/017296 A1 | 3/2001 |
| WO | 2009/071734 A1 | 6/2009 |
| WO | 2009/111409 A1 | 9/2009 |
| WO | 2011/037665 A2 | 3/2011 |
| WO | 2012/014231 A1 | 2/2012 |

OTHER PUBLICATIONS

Berger et al., "vTPM: Virtualizing the Trusted Platform Module," Security '06: 15$^{th}$ USENIX Security Symposium, *USENIX Association*, pp. 305-320 (2006).

International Search Report and Written Opinion dated Nov. 18, 2014, in International Application No. PCT/IB2014/063637.

Stumpf et al., "Improving the Scalability of Platform Attestation," Proceedings of the 3$^{rd}$ ACM workshop on Scalable trusted computing, *ACM*, pp. 1-10 (2008).

Alsouri et al., "Group-Based Attestation: Enhancing Privacy and Management in Remote Attestation," *Trust and Trustworthy Computing*, 63-77 (Jun. 2010).

Anderson et al. "Cryptographic Processors—a survey", *Technical Report*, No. 641, University of Cambridge Computer Laboratory (Aug. 2005) (http://www.cl.cam.ac.uk/techreports/UCAM-CL-TR-641.pdf).

Annonymous, "TrustZone System Security by ARM the Architecture for the Digital World," retrieved from the Internet at http://www.arm.com/products/processors/technologies/trustzone/index.php (2014).

Chen et al., "A New Direct Anonymous Attestation Scheme from Bilinear Maps," 2008. *ICYCS 2008. The 9$^{th}$ International Conference for Young Computer Scientists*, 2308-2313 (2008).

Garfinkel, "Terra: a virtual machine-based platform for trusted computer," *ACM SOSP. Proceedings of the ACM Symposium on Operating Systems Principles*, 193-206 (2003).

Guo et al., "A New DAA Scheme From One-off Public Key," *Electronics, Communications and Control (ICECC), 2011 International Conference*, 646-649 (Sep. 2011).

International Search Report and Written Opinion issued in PCT/IB2013/000680 dated Sep. 5, 2013.

International Search Report and Written Opinion issued in PCT/IB2013/000672, dated Jul. 23, 2013.

International Search Report issued in PCT/IB2013/000741 dated Dec. 12, 2013.

International Search Report and Written Opinion issued in PCT/IB2014/059638 dated Jul. 3, 2014.

International Search Report and Written Opinion issued in PCT/IB2014/059839 dated Aug. 7, 2014.

International Search Report and Written Opinion issued in PCT/IB2014/059845 dated Aug. 8, 2014.

Liu et al., "A Remote Anonymous Attestation Protocol in Trusted Computing," *Parallel and Distributed Processing, 2008. IPDPS 2008, IEEE International Symposium*, 1-6 (2008).

Manulis et al., "UPBA: User-Authenticated Property-Based Attestation," *Privacy, Security and Trust (PST), 2011 Ninth Annual International Conference*, 112-119 (2011).

Suh et al., "AEGIS: Architecture for Tamper-Evident and Tamper-Resistant Processing," Computation Structures Group Memo 461, CSAIL Computer Science and Artificial Intelligence Laboratory, Massachusetts Institute of Technology (Feb. 2003).

Sun et al., "A Strict Inter-Domain Anonymity Attestation Scheme," *Computer Design and Applications (ICCDA), 2010 International Conference*, V3-291-V3-295 (2010).

Tanveer et al., "Sealable Remote Attestation with Privacy Protection (Work in Progress)," *Trusted Systems*, 73-87 (Dec. 2009).

Yu et al., "An anonymous property-based attestation protocol from bilinear maps," *Computational Science and Engineering, 2009. CSE '09, International Conference*, 2:732-738 (2009).

Yu et al., "Real-Time Remote Attestation with Privacy Protection," *Trust Privacy and Security in Digital Business*, 81-92 (Aug. 2010).

Zhang et al., "Improving Privacy of Property-based Attestation without a Trusted Third Party," *Computational Intelligence and Security (CIS), 2011 Seventh International Conference on Computational Intelligence and Security*, 559-563 (2011).

Droz et al., "Wanted: A Theft Deterrent Solution for the Pervasive Computing World," *IEEE* 374-379 (2000).

Lin et al., SecureGo: A Hardware-Software Co-Protection Against Identity Theft in Online Transaction *2007 ECSIS Symposium on Bio-Inspired, Learning, and Intelligent Systems for Security*, 59-62 (2007).

European Search Report issued in application No. EP 19181565.3 dated Jul. 15, 2019.

\* cited by examiner

D-DATA FLOW
C-CONTROL FLOW
C-EXECUTABLE CODE FLOW

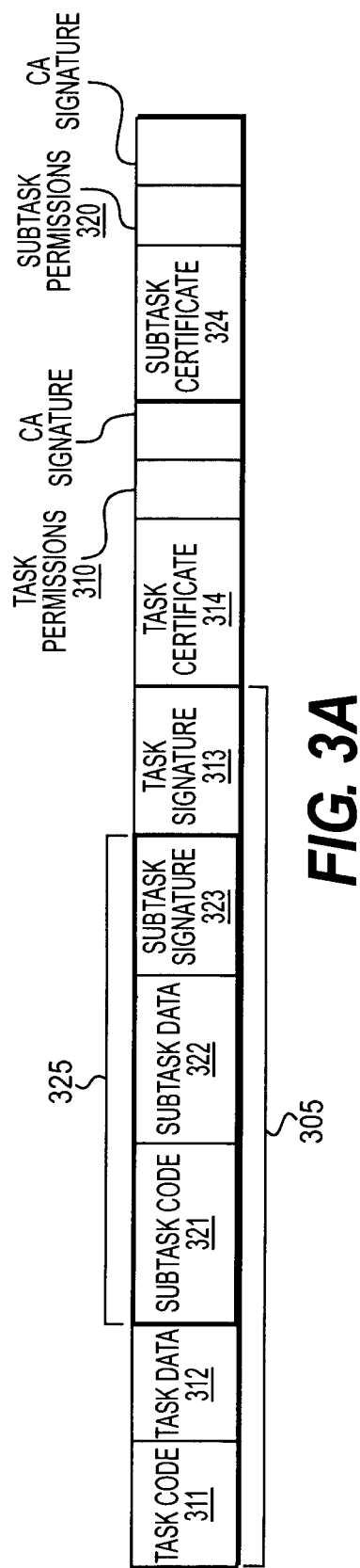
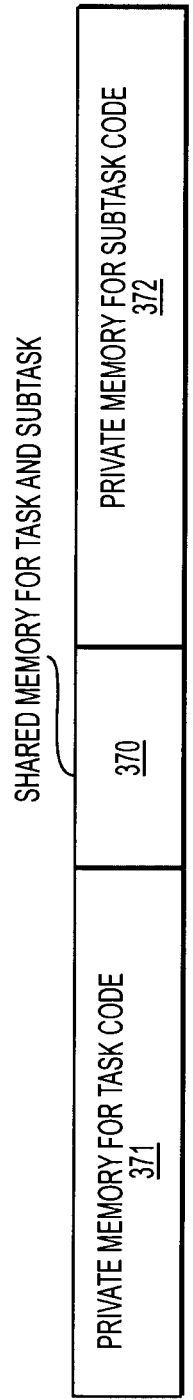
FIG. 3A
FIG. 3B

SYSTEMS, METHODS AND APPARATUSES FOR SECURELY STORING AND PROVIDING PAYMENT INFORMATION

RELATED APPLICATIONS

This application claims priority to U.S. Provisional Application No. 61/789,618, filed Mar. 15, 2013, entitled "SYSTEMS, METHODS AND APPARATUSES FOR SECURELY STORING AND PROVIDING PAYMENT INFORMATION," the content of which is incorporated herein by reference in its entirety.

FIELD OF THE DISCLOSURE

The systems, methods and apparatuses described herein relate to the security of computer network-based commercial and other sensitive data transactions.

BACKGROUND

Physical credit cards and debit cards have long been used as payment methods at point of sale transactions. As Internet shopping has become more popular, consumers are frequently using computers and other electronic devices to transmit the information stored within these cards. However, the online use of credit cards and other financial institutions has substantially increased the risk of consumers becoming the victims of identity theft, fraud and other related issues, as a result of security vulnerabilities in the electronic devices typically used for these transactions.

In many cases, these security vulnerabilities relate to vulnerabilities in the operating system of the device used to access the network, allowing for malicious code such as computer viruses, backdoors, and keyloggers to silently acquire sensitive financial information. On the other hand, the necessity of keeping and manipulating physical credit cards introduces additional problems, and can lack flexibility. What is needed is a suitable hardware platform to implement security solutions for the transmission of online payment information, which are not susceptible to software-based attacks and do not require consumers to keep or manipulate physical credit cards.

BRIEF DESCRIPTION OF THE DRAWINGS

FIG. 3A depicts an exemplary data structure incorporating two separate pieces of code in an embedded relationship.

FIG. 3B is one exemplary implementation of a logical partition of the data memory within the secure zone.

DETAILED DESCRIPTION

Figure 1:
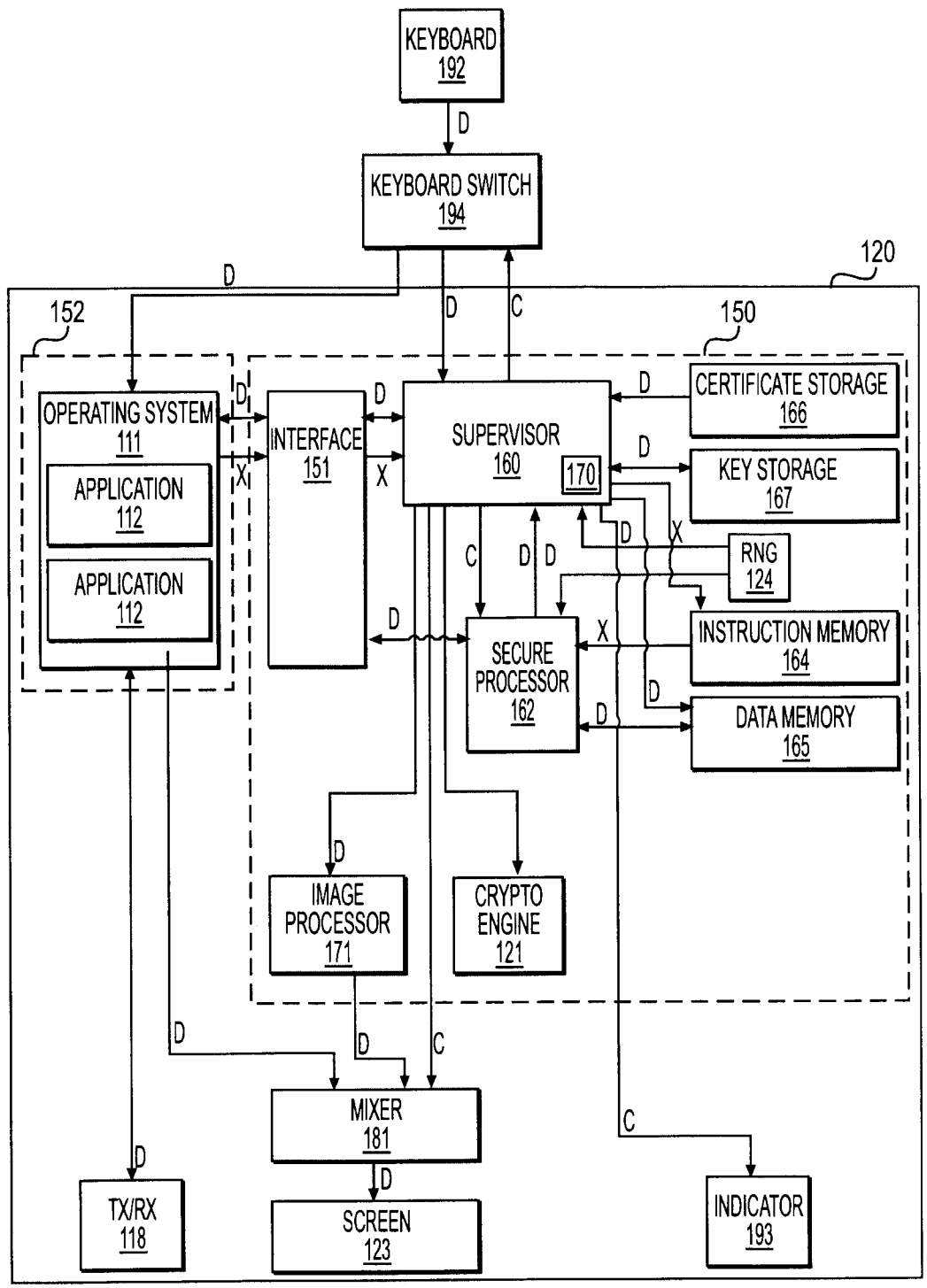
FIG. 1 is a block diagram of an exemplary system according to the present disclosure.

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

U.S. Provisional Patent Application No. 61/636,201, entitled "Secure Zone for Secure Purchases," and filed on Apr. 20, 2012, the entirety of which is hereby incorporated by reference, discloses systems, methods and apparatuses for, among other things, the secure use of credit cards (including integrated circuit cards, or "ICCs") in conjunction with a consumer payment device. In many current electronic devices, a skilled individual could intercept payment data, such as a credit card number, within an operating system running on the device—e.g., even if the financial data is encrypted before it is transmitted from one computer to another, each message could be intercepted within an operating system before it enters the encrypted channel—by, for example, installing malware (such as a virus, a keylogger or a Trojan horse) into the operating system of the user's computer.

The '201 Application discloses systems, methods and apparatuses for securely performing computer-based purchases or other payment actions or transactions. The inventions described therein provide a way to transfer certain activities to a secure zone, which cannot be compromised even if the operating system is under complete control of the attacker, so as to ensure that these computer-based payment activities truly remain secure from attack. For additional security, the secure zone disclosed therein may be made tamper-resistant and/or may use tamper detection techniques, with, for example, erasure of one or more cryptographic keys upon tamper detection.

The inventions disclosed in the present application provide additional systems, methods and apparatuses which enable the secure storage of data related to one or more credit cards on an electronic device and use of that data in a secure zone within the electronic device, thereby eliminating the necessity of using or manipulating physical cards.

FIG. 1 shows one example by which a secure zone 150 may be implemented in an electronic device 120, such as a computer, laptop, smart phone, television set, set-top box, etc. One exemplary implementation of a computing device having a secure zone is disclosed in U.S. Provisional Patent Application No. 61/623,861, entitled "Secure Zone for Digital Communications," and filed on Apr. 13, 2012, the entirety of which is incorporated herein by reference.

As shown on FIG. 1, the secure zone 150 may comprise an interface 151 to one or more non-secure zones 152. The term "non-secure zone," as used herein, refers to any device, processor, operating system, or other object, or combination thereof, which is capable of providing messages, codes, tasks or other information to a secure zone 150. For example, in the exemplary embodiment shown on FIG. 1, the non-secure zone 152 may comprise an operating system 111 and one or more applications 112. The interface 151 may be configured to receive these messages, codes or tasks from the non-secure zone 152. For example, if a secure zone 150 is implemented in a laptop, the interface 151 may be implemented as some kind of bus (for example, a PCIe bus) and may be configured to receive messages, code, tasks or other information from the laptop's central processing unit. If the secure zone 150 were implemented in a television, the interface 151 again might be implemented, for example, as some kind of bus (for example, an I$^2$C bus), and configured to receive messages, tasks or other information from a separate set-top box or from the microcontroller unit of the television.

A secure zone 150 may further comprise a supervisor 160 coupled to the interface 151, a secure processor 162, an instruction memory 164 and data memory 165. The supervisor 160 may be used to control access to the components of the secure zone 150, and may be used to enforce certain operational rules of the secure zone 150 to provide certain security assurances to the end-user. For example, in one embodiment, the supervisor 160 may be configured to: (1) receive a task or executable code that can be run on one or more secure processors 162 (only one is shown on FIG. 1) within the secure zone 150 via the interface 151; (2) check that certain requirements are fulfilled for this code; (3) if requirements are fulfilled, load this code into one or more instruction memories 164 located within the secure zone 150 (only one is shown on FIG. 1); (4) clear and/or pre-fill one or more data memories 165 located within the secure zone 150 (only one is shown on FIG. 1); (5) instruct the secure processor 162 to execute code loaded into the instruction memory 164; (6) control one or more indicators 193, which may be used to signal to a user certain security modes of the computing device 120; (7) control one or more peripherals within the computing device 120; (8) provide visual feedback to the end-user about the origin of the loaded code, and/or (9) clean up (to the extent required) after the code has been executed. Each of these functions are described in greater detail below. In one embodiment, the supervisor 160 may be implemented in hardware within the secure zone 151, such that the supervisor 160 cannot be affected or modified. For example, the supervisor 160 may be configured to fulfill one or more tasks as described in U.S. Provisional Application No. 61/623,861 or U.S. Provisional Patent Application No. 61/636,201.

In general, code or application refers to a set of instructions that may be executed on a computing device whereas task refers to the combination of the executable code and associated data that may be operated on by the secure zone. Throughout this disclosure, the terms task, code, executable code, or other similar terms may be used interchangeably to refer to any executable set of instructions (and, as appropriate, any associated data). Those with ordinary skill in the art recognize that, depending on the situation and context, the secure zone may execute code that has no associated data. Thus, references to code are not intended to imply that data is necessarily excluded, and references to tasks are not intended to imply that data is necessarily included.¶

As noted previously, the secure zone 150 may also comprise a secure processor 162, an instruction memory 164 and data memory 165. The secure processor 162 may be configured to execute code loaded into the instruction memory 164 and to exchange data with the interface 151. The secure processor 162 may be a general purpose processor or any suitable form of special purpose processor. In some embodiments, the secure processor 162 may be implemented as hardware separate from the supervisor 160; in some other embodiments, the supervisor 160 and the secure processor 162 may be implemented using the same hardware. In addition, it will be understood that while FIG. 1 shows the secure processor 162 as having a so-called "Harvard architecture" (with separate instruction memory 164 and data memory 165), other architectures (like the ubiquitous von Neumann architecture) may be used as long as equivalent instruction and data restrictions are enforced by the supervisor 160. By way of example and not limitation, the XN bit may be used in ARM® processors to provide some separation of data memory from instruction memory, as long as the XN bit in appropriate memory areas is enforced by the supervisor 160 and cannot be altered by code running within the secure zone 150. Similar separation may be achieved on x86 architecture by using the NX bit (also known as the XD bit on INTEL® CPUs and as Enhanced Virus Protection on AMD® CPUs).

In certain embodiments, the secure zone 150 may further comprise one or more cryptographic engines represented by a cryptographic engine 121 shown in FIG. 1. The cryptographic engine 121 may be used by the supervisor 160, among other things, in support of digital certificate verification. The cryptographic engine 121 may be configured to implement one or more cryptographic algorithms, such as Advances Encryption Standard (AES) algorithm, the Rivest-Shamir-Adleman (RSA) algorithm or any other existing or future-developed cryptographic algorithm. The cryptographic engine 121 may receive data from the supervisor 160 for encryption or decryption, and may provide the resulting ciphertext (or plaintext, as appropriate) back to the supervisor 160. In some embodiments, the cryptographic engine 121 also may be used by the secure processor 162; in this case, it may be desirable to have a clear separation between any cryptography-related tasks coming from the supervisor 160 to the crypto engine 121 and any cryptography-related tasks coming from the secure processor 162 to the crypto engine 121, so as to avoid any leaks of information associated with one component to the other. The secure zone 150 may also comprise a random number generator (RNG) 124 to provide support to cryptographic processes.

In other embodiments, the supervisor 160 may be configured to perform some or all of the functionality of the cryptographic engine 121 and/or random number generator 124, and a separate cryptographic engine 121 or RNG 124 may not be required.

To perform any requisite image processing, the secure zone 150 may further comprise a decoder 122. For example, if the electronic device 120 has a screen 123, and code running on the secure processor 162 needs to display one or more images on that screen 123, then the decoder 122 may be responsible for decoding any such images. This decoder 122 may comprise, for example, implementations of algorithms such as PNG, JPEG, etc. In some cases, the decoder 122 may also include certain text rendering capabilities. In some other cases the decoder 122 may also be capable of rendering video, for which it may additionally comprise, for example, implementations of algorithms such as H.264 and VC-1.

In some embodiments, the decoder 122 may be implemented in hardware (for example, as a specialized DSP processor). As shown on FIG. 1, the decoder 122 may be coupled to the secure processor 162, such that decrypted data may pass from the cryptographic engine 121 to the decoder 122.

In some other embodiments, the secure processor 162 may be configured to perform some or all of the functionality of the decoder 122, and a separate decoder may not be required. In still other embodiments, the secure zone 150 may not provide native support for image and/or video decoding, but may be able to receive and execute code (on the secure processor 162) designed to implement this type of media content processing.

In some embodiments, the instruction memory 164 and data memory 165 may be implemented as volatile memories. The absence of persistent writable storage for executable code may ensure that no viruses, back-doors, or other malicious code can be installed within the secure zone 150. In addition, the secure zone 150 may contain one or more certificate storages represented by a certificate storage 166 shown in FIG. 1, which may be implemented as read-only non-volatile memory, and one or more dedicated key storages represented by a key storage 167 in FIG. 1, which may be implemented as non-volatile memory. The certificate storage 166 may store one or more root certificates of one or more Certification Authorities (CA), which, in turn, may be used for certificate validation. The key storage 167 may be used, for example, for the storage of one or more private keys (which can be generated, for example, by the supervisor 160 using RNG 124), one or more corresponding public key(s) or associated with digital certificates, and/or a unique device identifier. This information may be used, among other uses, to identify and/or authenticate the secure zone 150.

As noted previously, a secure zone 150 is meant to be used within the context of a larger electronic device 120, such as a laptop, smart phone, tablet computer, etc. Thus, it will be understood that the electronic device 120 may comprise a number of components which are outside the secure zone 150, but may nonetheless assist in the operation of the secure zone 150. For example, the device 120 may comprise traditional input/output devices such as a keyboard 192 or a screen 123; in other embodiments, the device 120 may further comprise other I/O devices (such as a mouse, remote control transceivers, speakers, or cameras). These I/O devices may be beneficial to the operation of the secure zone 150 when, for example, a user desires to type a secure text message without the risk of the operating system 111 eavesdropping or modifying it. The device 120 may further comprise a communications port 118, enabling the device to communicate with other devices. In the foregoing example, the communications port 118 may be useful in creating a connection between the device 120 and a remote computer over a network connection. Also, such a electronic device 120 may run an operating system 111 and one or more applications 112.

As shown on FIG. 1, the device 120 also may comprise a means for indicating when the device 120 is operating in secure mode, shown on FIG. 1 as "indicator" 193. Such an indicator 193 may be, for example, a green LED which is placed on an outside case of the device 120 and readily visible to a user.

The device 120 according to the present disclosure may further comprise additional hardware allowing it to take control of these peripheral components of the device 120 from, e.g., the operating system 111. For example, the secure device 120 may comprise a mixer 181, allowing the secure zone 150 to control the screen 123. The device 120 might also comprise a keyboard switch 194, allowing the secure zone 150 to control the keyboard 192. In this manner, the same input/output devices (e.g., the keyboard 192 and screen 123) may be used to support both non-secure and secure zones. It shall be understood that while FIG. 1 shows components like the mixer 181 and the keyboard switch 194 as implemented outside of the secure zone 150, in some embodiments these components may be placed within the secure zone 150.

Finally, the secure zone 150 may be physically secured, such that it is tamper-resistant. The secure zone 150 may also (alternatively, or in addition to being tamper-resistant) incorporate one or more tamper detection techniques. For example, several tamper-resistant methods for protecting cryptographic processors are already known and have been described in the art; see http://www.cl.cam.ac.uk/techreports/UCAM-CL-TR-641.pdf. In some embodiments, it may be desirable, for example, to manufacture the secure zone 150 within a single chip. In another embodiment, the secure zone 150 might have a secure enclosure. In some of these embodiments, the secure zone 150 may be configured to execute one or more possible responses if it detects that the chip's integrity has been compromised, and/or if it detects penetration of the secure enclosure. These responses may vary from erasing any sensitive data to the physical destruction of all or part of the secure zone 150.

Figure 2:
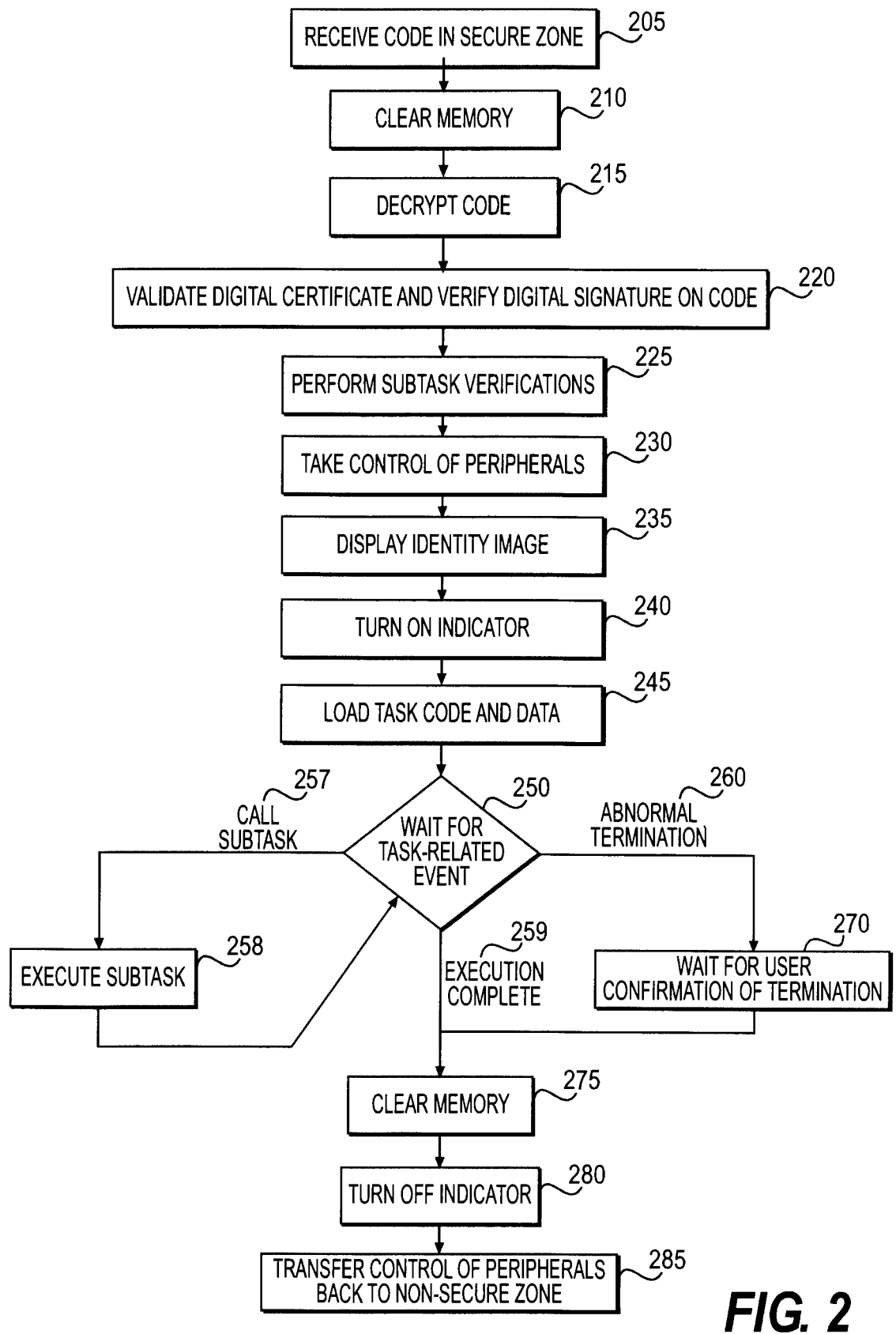
FIG. 2 is a flow diagram illustrating an exemplary method by which a system according to the current disclosure may accept a task for execution, organize the process of task execution, and cleanup after task execution.

FIG. 2 shows an exemplary method by which a secure zone 150 according to the present disclosure may accept a task for execution, organize the process of task execution, and cleanup after task execution.

At step 205, the interface 151 may receive the task from the non-secure zone 152, and may pass this code to the supervisor 160 for execution by the secure processor 162. It should be understood that whenever code is transferred at step 205, the code may additionally include related application data.

At step 210, prior to executing the received task, the supervisor 160 may clear all data stored within the instruction memory 164 and data memory 165. For example, the supervisor 160 might zero all of the instruction memory 164 and data memory 165. This may be performed to prevent old code, data, or both, from affecting the task currently being loaded, and to avoid information leaks between different tasks.

In some embodiments, the code provider may have encrypted the code (and any related application data) before sending it to the secure zone 150. For example, the code provider may have used a public key corresponding to a private key of the supervisor 160 (which may previously have been stored in the key storage 167, and which may be used by the supervisor 160 to decrypt the code) to encrypt the code. Thus, at step 215, if the code has been encrypted using a public key of the supervisor 160, the supervisor 160 may extract a copy of the corresponding private key from key storage 167 and direct the cryptographic engine 121 to decrypt the code (and any associated data, if applicable) using this private key.

In addition, the code (and any related data) also may have been digitally signed using the code provider's private key, guaranteeing the authenticity of the code. To enable validation of the digital signature and the signed code, a digital certificate capable of authenticating the code provider may be provided with the code. For example, the code provider may have a private key and a corresponding digital certificate which has been signed by a "root certificate" of a certificate authority. In such an implementation, the root certificate previously may have been stored in the certificate storage 166. In some embodiments, instead of a single certificate, whole "certificate chains" may be included with the code. In other embodiments, alternative ways of obtaining intermediate certificates (for example, issuing a request to a server (not shown) via the operating system 111 and communications port 118) may be used.

At step 220, the supervisor 160 may instruct the cryptographic engine 121 to validate the digital signature of the code provider. This validation of the digital signature will usually include validation of the certificate received with the code. (In embodiments having one or more subtasks, as described in greater detail below, this may include validating any digital signatures using one or more digital certificates received with any subtasks.) For example, if the code provider's certificate were signed by a certificate authority such as VeriSign®, the supervisor 160 may take a copy of the appropriate VeriSign root certificate from the certificate storage 166 and verify that this root certificate was used to sign the code provider's certificate, performing a typical public key infrastructure (PKI) signature validation; in some cases, a more elaborate validation (including, for example, certificate chains) may be implemented.

In some embodiments, other signature validation schemas (for example, those used in the simple public key infrastructure (SPKI)/simple distributed security infrastructure (SDSI) or the "web of trust" used in pretty good privacy (PGP)) may be used.

In some embodiments, the supervisor 160 may additionally perform certificate revocation list (CRL) validation to ensure that all certificates involved in the signature validation are still valid. A CRL can be obtained, for example, by means of a request to a server which hosts CRLs. This request can be made, for example, via the operating system 111 and the communications port 118 of the non-secure zone 152.

In some embodiments, the Online Certificate Status Protocol (OCSP) may be used to check certificate validity (instead of or in addition to CRL validation).

In certain embodiments, the code provider's digital certificate may differ slightly from a traditional certificate, such that it contains not only a text entry capable of identifying the certificate owner (usually the "CN" field of an X.509 digital certificate), indicating the name of the code provider associated with the certificate, but may further contain an image (for example, PNG or JPEG) with a visual representation of the identity of the code provider. This image may be a part of the digital certificate in the sense that it may be covered by the signature of the certificate issuer in the same way that the other fields of the certificate should be covered; for example, in an X.509 certificate such an "identity image" may be included as an extension in the "Extensions" field. As will be described in further detail below, in some embodiments, it may also be desirable to show this "identity image" on a predesignated portion of the screen 123 while the code is executed.

Figure 6:
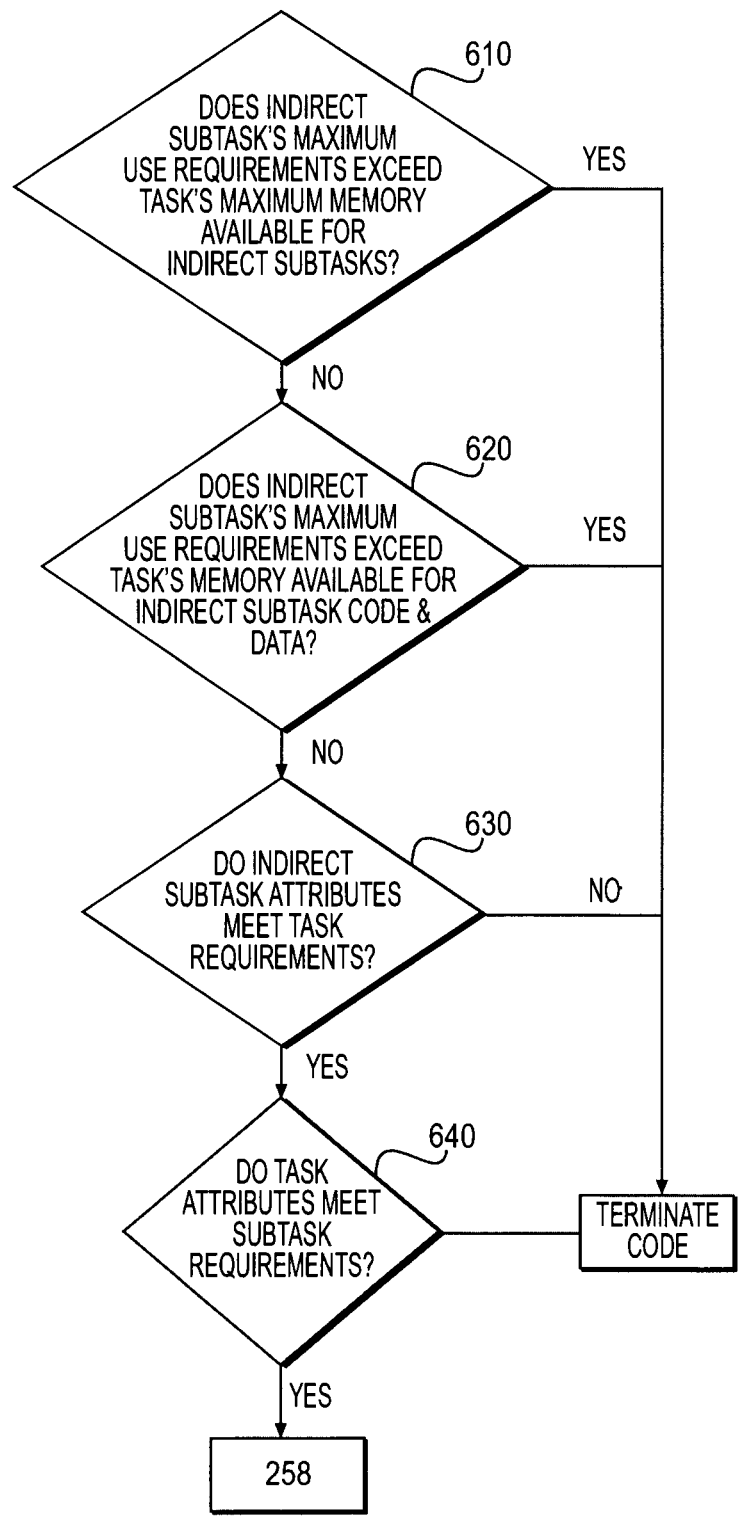
FIG. 6 is a flow diagram of an exemplary method by which a secure zone may verify one or more restrictions imposed on a task or a subtask.

As will be described in greater detail below, in some embodiments, a task may call one or more separate pieces of code, or subtasks. In such embodiments, it may be desirable, at step 225, to perform one or more verifications with respect to these subtasks. FIG. 6, also discussed in greater detail below, shows one exemplary method by which some of these verifications may be performed.

If, at step 225, all necessary subtask verifications pass successfully, at step 230, the supervisor 160 may take control of one or more peripherals of the computing device 120 that it needs in order to execute the received code. For example, the supervisor 160 may take control of the keyboard 192 and the screen 123 of the device 120. In such a case, the supervisor 160 may instruct the keyboard switch 194 to effectively disconnect the keyboard 192 from the non-secure components (such as the operating system 111) and to route all keyboard input to the secure zone 150. The supervisor 160 may also instruct the mixer 181 to combine output from image processor 171 and decoder 122 to form image on screen 123, effectively disconnecting the non-secure zone from the screen 123.

In some embodiments, it may be desirable to provide one or more affirmative confirmations to the user that the device 120 is now operating in a secure mode. Thus, at step 235, the supervisor 160 may provide the "identity image" from the code provider's certificate (which certificate has been validated in step 220) to the image processor 171, and may instruct the mixer 181 to show information from the image processor 171 on a designated area of the screen 123. At step 240, the supervisor 160 may turn on the indicator 193.

In such embodiments, the user may confirm that the task is running in the secure zone 150 by checking that the indicator 193 is on, and may confirm that the task was received from a legitimate code provider by verifying that the information displayed in the designated area of the screen 123 (e.g., the code provider's certificate identity image) corresponds to the user's expectations for this task.

If, for example, the information displayed on the screen 123 does not match the user's expectations—e.g., the code provider's name is incorrect, or the wrong identity image is displayed—the user may take an appropriate action to halt the task. For example, the user could press a special key combination on the keyboard 192 to instruct the supervisor 160 to terminate the task execution. Alternatively, if the information displayed on the screen 123 does match the user's expectations but the indicator 193 is off (which may happen, for example, if the operating system 111 is compromised and an attacker controlling the operating system 111 simulates screen output without relegating control to the secure zone 150), the user may similarly take any appropriate action to halt the task. Thus, in order for the user to be assured he is working in a completely secure environment, both (i) the identity image should be displayed in the designated area of screen 123, and (ii) the indicator 193 should be on.

At step 245, the supervisor 160 may load the received code into the instruction memory 164, may store any received application data into the data memory 165, and may instruct the secure processor 162 to begin executing the received code.

At step 250, the supervisor 160 may begin waiting for one or more events related to code execution.

For example, at transition 257, the supervisor 160 may receive a request from the currently-running code to execute one or more subtasks. Handling of this type of event, shown as step 258 on FIG. 2, is discussed in greater detail below with respect to FIGS. 3A-3B and 4-8.

If, at transition 259, the code execution has finished, the code running on the secure processor 162 may send a notification back to the supervisor 160 notifying it that code execution has finished, and the supervisor 160 may perform certain steps to transition control back to the non-secure zone 152.

In some embodiments it may happen that, as shown at transition 260, code running on the secure processor 162 terminates abnormally (for example, via a secure processor 162 exception).

In this case, at step 270, the supervisor 160 may display a notification message to the user indicating that a secure task has been abnormally terminated and that the system is about to switch to non-secure mode of operation. The method may wait at step 270 until the user confirms that she has viewed this notification message (for example, by pressing a button on the keyboard). This confirmation may be desirable because, otherwise, the user may have the erroneous perception that the secure task is still running after it has actually abnormally terminated.

At step 275, the supervisor 160 may begin a "cleanup" routine and clear all the instruction and data memories 164 and 165 (for example, by zeroing them). At step 280, the supervisor 160 may shut off the indicator 193. Finally, at step 285, the supervisor 160 may transfer control of any I/O devices back to the non-secure zone 152; for example, it might instruct the keyboard switch 194 to process keyboard 192 input through the operating system 111 of the computing device 120, as well as to instruct the mixer 181 to display information which comes from the operating system 111, on screen 123.

In certain embodiments it may be desirable for a task to include more than one piece of code. This may allow for secure processing in substantially more complicated environments, such as in the case of secure credit card processing. FIGS. 3A-3B and 4-8 illustrate exemplary methods (and associated data structures) for the execution of tasks comprising multiple pieces of code.

FIG. 3A illustrates one exemplary data structure for implementing tasks with two pieces of executable code (and data associated with each piece of executable code). As shown on FIG. 3A, an "ordinary subtask" 325 may be formed by subtask code 321, subtask data 322, and an associated subtask digital signature 323. A task 305 may be formed by task code 311 and task data 312 together with the ordinary subtask 325, all of which may be encompassed by the task digital signature 313.

An ordinary subtask 325 may be provided to the user in conjunction with the task 305, such that the subtask 325 will have been added to the task 305 by a task developer at the time of task development. The subtask 325 may form an integral part of the task 305, such that it is covered by the task developer's signature (in addition to all other parts of the task 305). For example, as will be described with respect to FIGS. 7 and 8 below, an online merchant may be developing a task 305 to be distributed to consumers which is designed to facilitate online payments to the merchant. The merchant's bank or financial institution may create an ordinary subtask 325 for the purpose of transferring funds into the merchant's account and provide it to the merchant. The merchant may then add this subtask 325 to the merchant's task 305 for subsequent provision to the consumer, such that any payments made to the merchant are deposited into his bank account.

It is to be understood that a task 305 may contain more than one ordinary subtask 325 (with each ordinary subtask potentially having its own set of digital certificates). This may be used, for example, such that the task may switch execution to one of its subtasks, wait for the subtask's termination and then switch to another subtask. It is further possible that one or more of these ordinary subtasks may contain further sub-subtasks and so forth.

Both the task 305 and the ordinary subtask 325 (as well as any additional subtasks) may include one or more permissions, which may be used to describe the access their respective code may have to various portions of the secure zone 150 and/or any peripheral devices (such as, the keyboard 192 and/or the screen 123). These permissions may be established by one or more certificate authorities, and may be contained within the task or subtask's digital certificate. For example, subtask code 321 (within subtask 325) may be permitted to access portions of the secure zone 150 as described in subtask permissions 320, while the task permissions 310 may describe which portions of the secure zone 150 may be accessed by task code 311. As shown on FIG. 3A, a task digital certificate 314 may contain task permissions 310, while a subtask digital certificate 324 may contain subtask permissions 320. These permissions may be implemented, for instance, within the "Extended Key Usage" field in an X.509 certificate. In some embodiments, certificates may not be included in the task, but may be obtained separately without affecting security.

In some embodiments, it may be desirable for the code developer to be able to assign permissions to the code she develops. For example, for additional security, the code developer may wish to reduce the permissions associated with a particular task or subtask. In these embodiments, another set of permissions may be included within the task (or the subtask, as applicable). To the extent any such secondary permissions are included within a task or subtask, however, it may be desirable to have the supervisor 160 interpret these permissions in view of any existing permissions already signed by a certificate authority. For example, if the code developer wants to add an additional set of permissions to task code 311, then these additional permissions may only modify task permissions 310. It may further be desirable to require that any such secondary permissions cannot exceed their respective underlying permissions. For example, in the case of task code 311, the additional permissions may not be permitted to enlarge the scope of task permissions 310 as provided by the certificate authority.

When the supervisor 160 receives a task (such as the task 305 containing the ordinary subtask 325 as shown in FIG. 3A), the supervisor 160 may load task code 311 and task data 312 into instruction memory 164 and data memory 165, as appropriate, for subsequent execution (e.g., as described in greater detail above with respect to FIG. 2 at step 245). During the execution of the task code, the supervisor 160 may enforce restrictions specified in task permissions 310. Upon receipt of the task, the supervisor 160 may also store subtask permissions 320, subtask code 321, and subtask data 322 somewhere within the secure zone 150 (for example, subtask code 321 may be stored in instruction memory 164 and subtask data 322 may be stored in data memory 165, potentially in encrypted form to prevent misuse). At this point, however, neither the subtask code (nor its associated subtask permissions 320 or subtask data 322) takes any active part in the execution of task code 311.

As described in greater detail previously, with respect to FIG. 2, at step 250, the supervisor 160 may wait for one or more task-related events. Such events may include certain types of requests from the currently-running code to the supervisor 160. In embodiments supporting tasks with embedded subtasks, for example, as described with respect to FIG. 3A, the supervisor 160 may support requests from the currently-running task code to execute one or more subtasks. For example, at step 257, the supervisor 160 may receive a request from task code 311 to execute subtask code 321 (step 258). Such a request may contain, for example, the start and end of a region within the data memory 165 which subtask code 321 may be allowed to use for its own purposes, and the start and end of an area within the data memory 165 which will be accessible for both task code 311 and subtask code 321 for the purpose of exchanging data between task code 311 and subtask code 321.

FIG. 3B is one exemplary logical division of data memory 165 into three areas, which can be used by two pieces of code, task code 311 and subtask code 321. It will be understood, however, that the relative location and size of the three areas is merely exemplary and can depend on many factors, including the preferences of the developers of task code and any guidelines for adding an ordinary subtask 325 to a task 305 (which may be created, for instance, by the developers of subtask 325). As shown on FIG. 3B, data memory block 371 is "private" to the task code, data memory block 372 is "private" to the subtask code, and data block 370 is a shared area which may be accessible to both the task code and the subtask code. For example, if the shared data block 370 is used, the task code may store some data within the shared memory area 370 that may be accessed by the subtask code when the task code is suspended and the subtask code is loaded for execution. Similarly, the subtask code may store data within the shared memory area 370 that may be accessed by the task code when the subtask code is terminated and the task code is resumed.

Figure 4:
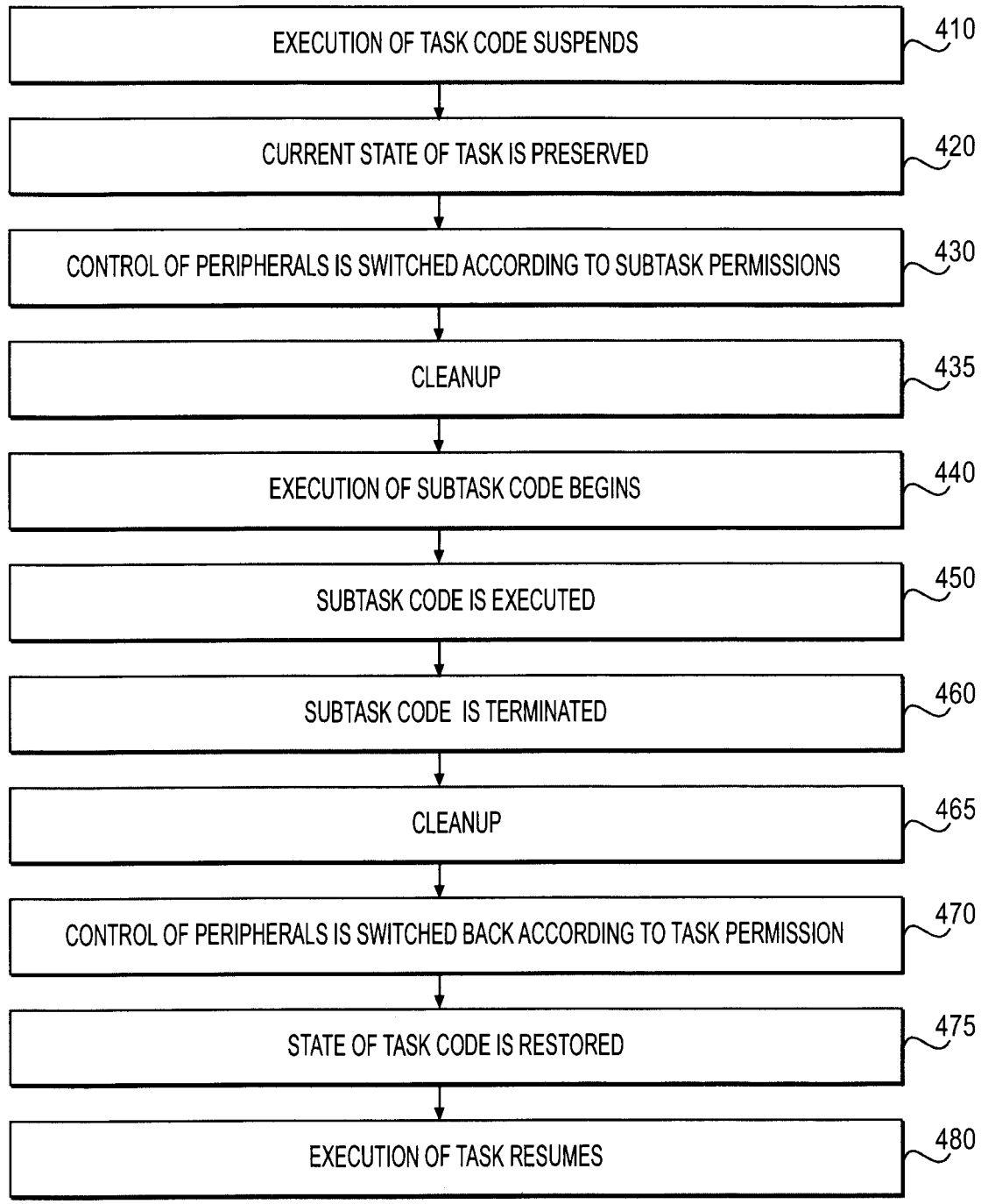
FIG. 4 is a flow diagram of an exemplary method by which a secure zone may switch tasks.

FIG. 4 illustrates one exemplary method by which the supervisor 160 may handle a request from a task 305 currently running on the secure processor 162 to call an ordinary subtask 325 (this method cumulatively shown on FIG. 2 as step 258).

At step 410, the supervisor 160 may instruct the secure processor 162 to suspend the execution of task code 311, and at step 420, the supervisor 160 may store the current state of the task 305. For example, the supervisor 160 may store the current state of the task code 311. In certain embodiments, this might call for the supervisor 160 to store a current value of a program counter register and/or any other registers of the secure processor 162 within temporary storage 170 of the supervisor 160. The supervisor 160 also may preserve the current state of any data memory 165 associated with task code 311. This may include, for example, instructing the secure processor 162 (and/or the data memory 165) that the subtask code 321 which is about to run is only permitted to access data memory areas 370 and 372. In addition to, or instead of, such restriction, the supervisor 160 may encrypt the data memory area 371, and/or calculate a secure hash (such as SHA-256) of the data memory area 371 and store the value of this hash within the temporary storage 170 of the supervisor 160. The supervisor 160 further may store the current state of any peripherals (such as the screen 123, and/or the keyboard 192). For example, the supervisor 160 may read the current state of any LEDs on the keyboard 192 and store them within the temporary storage 170. Similarly, the supervisor 160 may read the state of screen 123 and store it (for example, as an array of pixels) within the temporary storage 170.

At step 430, the supervisor 160 may switch control of any peripherals according to the subtask permissions 320 of the ordinary subtask 325. For example, in certain embodiments, the task permissions 310 of task 305 may allow the task code 311 to access certain peripherals (such as the keyboard 192) but the subtask permissions 320 of the ordinary subtask 325 may prohibit the subtask code 321 from accessing some of the peripherals allowed in task permissions 310. In addition, the screen 123 also may be cleared at this step 430.

At step 435, the supervisor 160 may execute a cleanup routine to ensure that the subtask code 321 which is about to run is not affected by any data left in the data memory 165 by the execution of task code 311. For example, the supervisor 160 may zero data memory area 372.

At step 440, the supervisor 160 may instruct the secure processor 162 to begin executing subtask code 321. For example, the supervisor 160 may direct the secure processor 162 to start execution at a predefined point within the subtask code 321. Alternatively, the starting point of the subtask code 321 may be included in the task 305. The supervisor 160 may also provide a reference to the secure processor 162 allowing it to locate and access data memory areas 370 and 372 intended for use by the subtask code 321. For example, in certain embodiments, the supervisor 160 may pass a pointer to the secure processor 162 referencing these memory locations via one or more registers located within the supervisor 160.

During the execution of subtask code 321 (as shown at step 450), the supervisor 160 may enforce any subtask permissions 320 associated with the subtask code 321. For example, if at step 450, the supervisor 160 receives a request from subtask code 321 for access to a physical credit card reader (not shown), the supervisor 160 may verify whether the subtask permissions 320 allow the subtask code 321 to access the card reader and proceed with step 252 only if those subtask permissions 320 permit such access.

At step 460, the subtask code 321 may have terminated its execution, i.e., the ordinary subtask 325 may be completed. At step 465, the supervisor 160 may perform one or more cleanup activities in preparation for transitioning back to the execution of task code 311; for example, the supervisor 160 may zero the memory area 372. At step 470, the supervisor 160 may switch the control of any peripherals (such as screen 123 and/or keyboard 192) back to the state they were in before execution of subtask code 321 started (or in accordance with the task permissions 310, if the peripherals' state was not stored at the time the ordinary subtask 325 began).

At step 475, the supervisor 160 may restore the state of the task 305, which was stored at step 420. For example, the supervisor 160 may restore the state of task code, such that it begins executing where it left off at the time the ordinary subtask 325 was called. This may be accomplished by, for example, updating a program counter and/or any other registers of the secure processor 162 to the values stored in temporary storage 170, for example, during step 420. If the memory area 371 was encrypted at step 420, the supervisor 160 may ensure that it is decrypted. If a secure hash was calculated at step 420, the hash may be recalculated and compared to the original hash value. If the hash calculated at this step 475 does not match the hash value stored at step 420, it may be deduced that the subtask code has managed to violate the integrity of task code's data memory block 371, and the execution of the task code should not be resumed (possibly with an appropriate message to the user). Additionally, if at step 420, the secure processor 162 and/or the data memory 165 were instructed to restrict access only to data blocks 370 and 372, at this step 475 the supervisor 160 may lift this restriction, and the task code 311 (and the secure processor 162) may receive access to the entire data memory 165. Finally, the state of any peripherals (such as the keyboard 192) stored, for example, in step 420, may be restored. If the state of the screen 123 was stored, the state of screen 123 may be restored to the stored value; otherwise, the screen 123 may be blanked.

At step 480, the supervisor 160 may instruct the secure processor 162 to resume the execution of task code 311.

The embodiments described thus far have detailed two modes of operation of the device 120: non-secure mode and secure mode. To indicate that the device 120 is operating in secure mode, as described above, the indicator 193 may be turned on. In another embodiment according to the present disclosure, the device 120 may run in a third "super-secure" or "extra-secure" mode of operation, as will be described in further detail below. In such an embodiment, the indicator 193 may have another super-secure state (in addition to the "off" and "on" states described above); this super-secure state of the indicator 193 may indicate that device 120 is currently operating in super-secure mode. In such an embodiment, for example, the indicator 193 may be implemented as two separate LEDs (each readily visible to the user). If one LED is on, it may indicate that the device 120 is operating in the secure mode (described in greater detail previously); if two LEDs are on, the device 120 may be operating in a super-secure or extra-secure mode. Whether any piece of code (such as task code 311 or subtask code 321) is allowed to switch to super-secure mode may be specified within its respective permissions fields (e.g., task permissions 310 or subtask permissions 320 respectively).

In certain embodiments, it may be desirable for a task to call a second type of subtask, an "indirect subtask," in addition to one or more ordinary subtasks 325. As described above, an ordinary subtask 325 may be added to a task at the time of task development, before the task is distributed to a user. By contrast, an indirect subtask may be created at any time by any third party and may be designed to interface to one or more ordinary subtasks, indirect subtasks, or tasks not known in advance, but having certain properties defined by the third party which developed the indirect subtask. For example, in the example described with respect to FIGS. 7 and 8 below, a purchaser in an online transaction may wish to transmit money to the merchant from which he is buying goods or services. The purchaser's bank (usually referred to as the "issuing bank") may create an indirect subtask—configured to interface with the merchant's task and the acquiring bank's ordinary subtask—for the purpose of paying money from the consumer's account (e.g., a debit account or a credit account) as part of an online transaction. The task developer—in this case, the merchant—may specify, using one or more indirect subtask restrictions, how and which types of indirect subtasks may interface with the task, but may not know in advance exactly which indirect subtask will be used for that purpose.

When a non-secure zone 152 wants to load a task requiring an indirect subtask of a certain type, the user may select one or more appropriate indirect subtasks (e.g., by interacting with an application 112 running in the non-secure zone 152), and the non-secure zone 152 may combine the task with the selected indirect subtasks, pushing the combined task to the supervisor 160 for execution.

Figure 5:
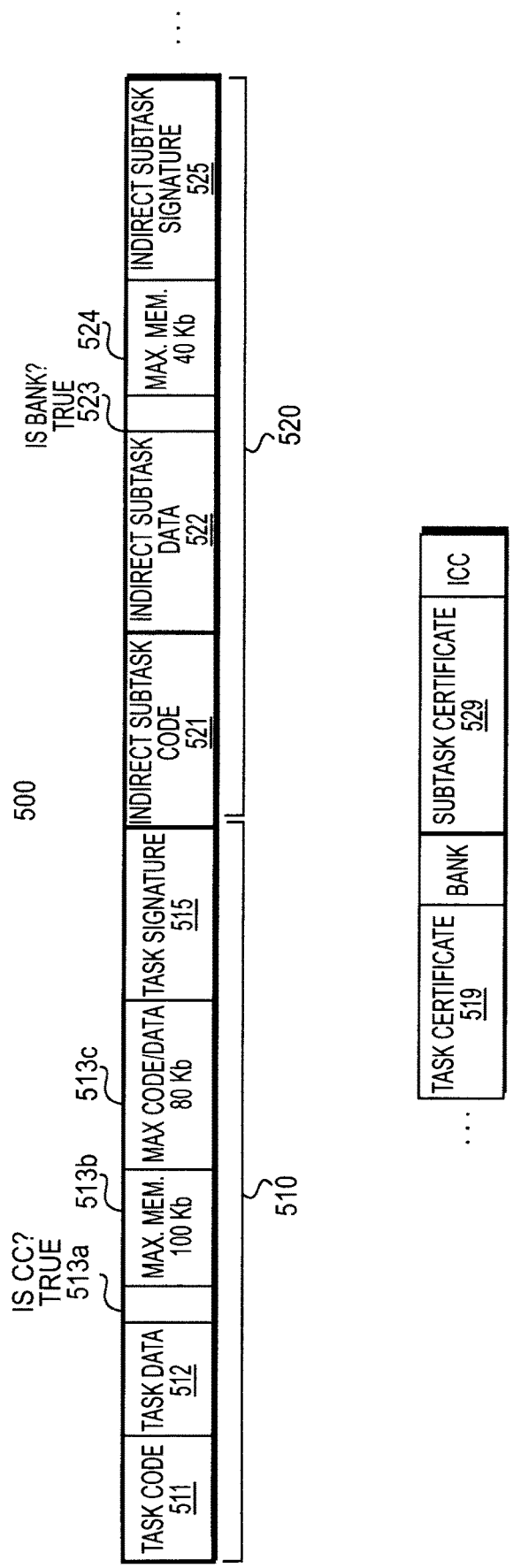
FIG. 5 is an exemplary data structure incorporating two separate pieces of code in an embedded relationship.

FIG. 5 illustrates one embodiment of a data structure for an exemplary combined task 500, comprising a task 510 and an indirect subtask 520. Although FIG. 5 shows only one indirect subtask 520, it will be understood that a task may comprise more than one indirect subtask 520, and that multiple ordinary subtasks 325 and/or multiple indirect subtasks 520 may be present within the same task.

As shown on FIG. 5, the task 510 first may comprise its task code 511 and task data 212. The task 510 may additionally comprise one or more fields describing certain restrictions on any indirect subtasks 520 which might be called. For example, the task 510 may comprise an "isICC" flag 513a. The task 510 may set this flag 513a to indicate that the indirect task 520 to be called is an ICC indirect subtask authorized by a legitimate financial institution. The task 510 may further comprise one or more indirect subtask memory availability fields specifying the maximum amount of various types of memory available within the secure zone 150 for use by its subtasks. For example, as shown on FIG. 5, an exemplary task 510 may set an overall maximum memory usage of 100 Kb (shown as field 513b) and a limit on the total size of the indirect subtask code 521 and indirect subtask data 522 of 80 Kb (shown as field 513c). It will be understood, however, that the specific nature of these restrictions 513a, 513b and 513c is merely exemplary, and that any number and type of restrictions may be used for any verification purpose appropriate for a task 510. It should be noted that if a task 510 may call multiple indirect subtasks, multiple fields 513a, 513b, and 513c may be present within the task 510 (for example, one set of fields 513a, 513b, and 513c for each indirect subtask that can be called from the task 510).

As described with respect to FIG. 3A, the task 510 may be digitally signed by its code provider, shown on FIG. 5 as task digital signature 515. In embodiments wherein a task 510 contains one or more additional restriction fields, the task digital signature 515 may extend to cover the additional fields. For example, as shown in FIG. 5, the task digital signature 515 may extend to cover not only the task code 511 and task data 512, but also the isICC flag 513a and memory availability fields 513b and 513c. A task digital certificate 519 may be supplied with the task 510 and may be used to validate the digital signature 515 associated with the task 510. (It will be understood that in some embodiments this digital certificate may be a whole "certificate chain," which may be necessary to validate the signature using, for example, one or more root certificates).

The indirect subtask 520 shown on FIG. 5 is similar in structure to an ordinary subtask 325. As shown on FIG. 5, an indirect subtask 520 first may comprise its indirect subtask code 521 and indirect subtask data 522. The indirect subtask 520 further may comprise one or more requirements regarding the calling task 510. For example, an indirect subtask 520 may comprise an "isBank" flag 523. The indirect subtask 520 may set this flag to indicate, for example, that the calling task 510 must be associated with a bank or other financial institution. This can be checked, for example, by confirming that the task digital certificate 519 (associated with the task 510) identifies a bank or financial institution as the certificate owner (whose identification can be provided, for example, as an extension field in a X.509 certificate). In addition, the indirect subtask 520 may comprise one or more fields describing one or more of its characteristics. For example, as shown on FIG. 5, field 524 may indicate that the maximum memory requirement of the indirect subtask 520 is 40 Kb.

Like tasks and ordinary subtasks, the indirect subtask 520 may be digitally signed by its code provider; as shown on FIG. 5, a subtask digital signature 525 may be associated with the indirect subtask 520. In embodiments wherein the indirect subtask 520 comprises one or more task requirements, characteristics, or both, the digital signature 525 may extend to cover these fields. For example, as shown on FIG. 5, the subtask digital signature 525 may extend to cover the isBank field 523 and memory usage field 524, as well as indirect subtask code 521 and indirect subtask data 522.

The combined task 500 may further comprise an indirect subtask digital certificate 529, which may be used to validate the digital signature 525 associated with the indirect subtask 520. (Again, it will be understood that in some embodiments this digital certificate may be a whole "certificate chain," which may be necessary to validate the signature using, for example, one or more root certificates).

As noted previously, FIG. 2 shows an exemplary method by which a task may be initialized and loaded for execution, and FIG. 4 shows an exemplary method by which a subtask may be called by a currently executing task (e.g., in fulfillment of step 258 shown on FIG. 2). The methods described herein with respect to those figures similarly may be used for the loading and execution of combined tasks 500 comprising indirect subtasks 520.

As noted in the discussion with respect to FIG. 2, in some embodiments, before an indirect subtask 520 is executed (e.g., at step 258), it may be desirable to perform one or more verifications with respect to the indirect subtask 520. This is reflected as step 225 on FIG. 2. FIG. 6 shows one exemplary method by which these verifications may be performed.

At step 610, the supervisor 160 may compare the indirect subtask's maximum memory use field 524 (which describes the maximum amount of memory the subtask 520 will need to run) with the task's maximum allocated subtask memory field 513*b*. For example, in the exemplary embodiment shown on FIG. 5, the task 510 is configured to provide up to 100 Kb of memory to subtasks (see 513*b*), and the indirect subtask 520 has indicated that it will require, at most, 40 Kb of memory to run (see 524).

At step 620, the supervisor 160 may compare the indirect subtask's maximum memory use field 524 with the maximum memory limits imposed by the maximum subtask code/data size field 513*c*. For example, in the exemplary embodiment shown on FIG. 5, the task 510 is configured to provide up to 80 Kb of memory for the combination of subtask code 521 and data 522 (see 513*c*), and the indirect subtask 520 has indicated that it will require, at most, 40 Kb of memory to run (see 524).

At step 630, the supervisor 160 may compare the attributes of the subtask digital certificate 529 with any corresponding requirements imposed by the task 510. For example, as shown on FIG. 5, the task 510 contains an isICC flag 513*a* which is set to have a value of "true." In this case, the corresponding subtask digital certificate 529 must identify the indirect subtask as produced by a legitimate ICC developer, e.g., a card-issuing bank (for example, it may be achieved by an extension field in the X.509 certificate).

Similarly, at step 640, the supervisor 160 may compare the attributes of the task digital certificate 519 with any corresponding requirements imposed by the subtask 520. In the exemplary embodiment shown on FIG. 5, the subtask 520 contains an isBank flag 523 which is set to "true." In this case, the corresponding task digital certificate 519 should identify the task 510 as associated with a bank or other financial institution.

In some embodiments, if an indirect subtask 520 is launched by another subtask, the certificate of the "nearest" subtask (i.e., the immediate caller of the indirect subtask 520) may be used for restriction verification.

If all of these tests pass successfully, the method may proceed, and at step 258 (FIG. 2) the indirect subtask 520 may execute, e.g., as described with respect to FIG. 4.

Figure 7:
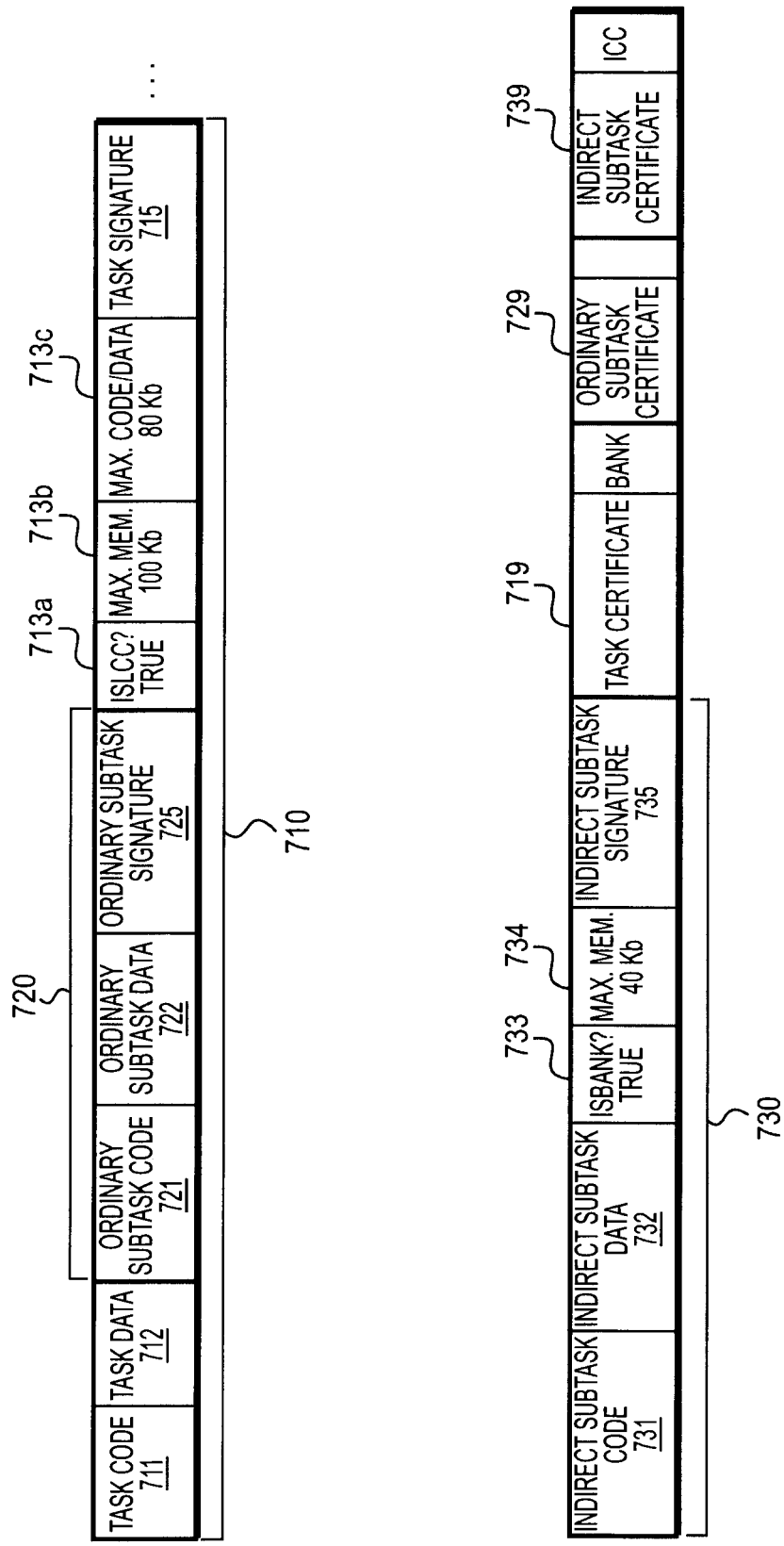
FIG. 7 is an exemplary data structure incorporating three separate pieces of code in an embedded relationship, implementing an exemplary online payment application.
Figure 8:
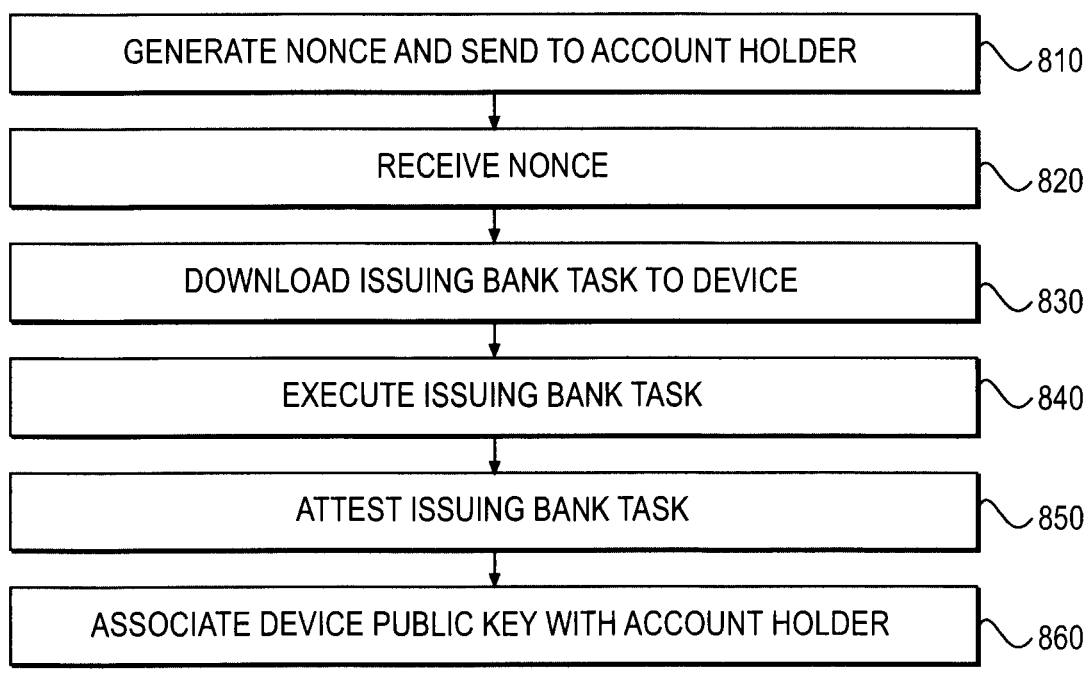
FIG. 8 is a flow diagram of an exemplary method by which the secure zone may implement an online payment application.

The foregoing discussion with respect to FIGS. 5 and 6 described one exemplary implementation of a system using a generic indirect subtask 520 which may be used in any type of application. FIGS. 7 and 8 illustrate a particular embodiment of an online purchasing application using a combined task 700, wherein the combined task 700 comprises a merchant task 710, a merchant bank's ordinary subtask 720 (both of which may be provided by the merchant to a consumer) and a card-issuing bank's indirect subtask 730 (which may replace a consumer's credit card, debit card, or other form of payment credential, and which may be provided by the consumer's card-issuing bank or other financial institution).

As shown on FIG. 7, the merchant's task 710, comprising task code 711 and task data 712, may be developed by (or on behalf of) an online merchant and digitally signed using the merchant's (or its code provider's) private key (see task digital signature 715). This task 710 may be used to facilitate the online purchase of goods or services offered by the merchant.

The merchant's bank (or other financial institution) may provide to the merchant an ordinary subtask 720, comprising subtask code 721 and subtask data 722, which may be used to acquire funds from the consumer while securely protecting the merchant's financial account information. This ordinary subtask 720 may have been digitally signed using the bank's private key (see ordinary subtask digital signature 725), and may be provided to a consumer for execution in the secure zone 150 within the merchant's task 710.

In some embodiments, the secure zone 150 may be coupled to a physical credit card reader, capable of reading magnetic stripe and/or ICC data from a physical credit card. This information may be provided by the supervisor 160 to the merchant's task 710 and its bank's ordinary subtask 720.

In other embodiments, as shown on FIG. 7, the consumer's card-issuing bank (or other financial institution) may provide one or more ICC indirect subtasks 730, which the user may store in his or her electronic device 120 (such as within the non-secure zone 152, for example). Each indirect subtask 730, comprising indirect subtask code 731 and data 732, may be used to facilitate payment to the merchant from an account of the cardholder. In one such embodiment, the ICC indirect subtask code 731 may represent ICC card logic, and the indirect subtask data 732 may include one or more associated keys (secret, private/public, or both), eliminating any need for a physical card and card reader.

To enhance the overall security of the system, the task 710 may be configured to include one or more indirect subtask restrictions 713, which may be used in conjunction with any such indirect subtasks 730. For example, the task 710 may specify, using, e.g., an isICC flag 713*a*, that only indirect subtasks 730 that have been digitally signed by a code developer certified by a certificate authority as a legitimate "ICC developer" may be used as indirect subtasks for the task 710. This may be accomplished by, for example, adding an "ICC" field as an extension into an X.509 certificate, or signing indirect subtask certificates 739 with a specific root certificate. Accordingly, as shown on FIG. 7, the indirect subtask 730 may include a digital signature 735 signed by the card-issuing bank (or its authorized agent).

Similarly, the ICC indirect subtask 730 may further comprise one or more task restriction fields which may be used to improve the security of the system. As shown on FIG. 7, the isBank flag 733 may be used to specify that only subtasks 720 which have been digitally signed by a bank may call ICC indirect subtask 730.

Finally, the combined task 700 may be provided with digital certificates necessary to authenticate digital signatures provided by the merchant's task 710, the merchant's bank's ordinary subtask 720, and the card-issuing bank's indirect subtask 730, shown on FIG. 7 as certificates 719, 729 and 739, respectively.

Accordingly, a consumer may perform online payment transactions using the indirect subtask 730 developed by his issuing bank instead of a physical credit card. Essentially, an indirect subtask 730 (as, for example, shown in FIG. 7) represents and acts as a "virtual ICC."

In some embodiments, to prevent the non-secure zone 152 from accessing any indirect subtask code 731 or data 732, the indirect subtask 730 may further be encrypted with a public key of the supervisor 160. As long as the ICC indirect subtask 730 is encrypted in this way, it may be stored within the non-secure zone 152 (for example, it may be stored on a hard disk drive controlled by the OS 111). It will be understood that, in order to encrypt the indirect subtask 730 with the public key of the supervisor 160, the issuing bank will need some mechanism by which it acquires a copy of the supervisor's public key. In addition, it may be desirable for the issuing bank to be able to confirm that a specific supervisor 160 does actually possess a public key (and the corresponding private key) it purports to possess.

In one exemplary embodiment, the issuing bank may instruct its account holders to physically travel to an identified location (such as a bank branch) with their computing devices 120. Each account holder may load a task onto his or her computing device 120 designed to extract the public key from the secure zone 150 for provision to the issuing bank. This process may include (i) some form of code attestation of the task running on the account holder's computing device 120, (ii) some form of authentication that the specific device which is currently present is the device it claims to be (which can be done, for example, by asking to enter a specific one-time PIN into device keyboard), or (iii) both.

FIG. 8 shows yet another exemplary method by which a card-issuing bank may obtain the public key of an account holder's computing device 120, while receiving sufficient assurances that the device 120 is legitimate and properly held by the account holder.

At step 810, the issuing bank may generate a nonce, store it electronically, and send a copy of the nonce to the account holder via physical letter, or any other suitable method having a comparable level of security (provided that such method may ensure that nobody except for the designated account holder may have received the nonce).

In some embodiments, the computing device 120 may have one or more photoelements (not shown), which may be connected to the secure zone 150 and configured in the device 120 in such a manner that each photoelement cannot be used or accessed by any component of the non-secure zone 152. In some such embodiments, use of a photoelement may require a special privilege specified in the code signer's digital certificate. In embodiments having photoelements, the nonce may be bar coded (rather than in a human-readable format), such that the nonce cannot be entered manually but should be read by, for example, passing the photoelement over the bar code. This variation may be used to reduce opportunities for phishing (i.e., luring account holders to enter their nonces into the keyboard 192 when the device 120 is not in secure mode and keyboard input could be eavesdropped by the operating system 111). The correspondence may further include any relevant instructions for using the nonce, as described in further detail below.

At step 820, the account holder may receive the nonce from the issuing bank, and at step 830, may download to his computing device 120 an issuing bank task (not shown). In certain embodiments, this process may require the account holder to log in to the bank website.

The issuing bank task, like any other task described herein, may comprise both code and data. The issuing bank task may be configured to: (a) read one or more public keys of the device 120 from the secure zone 150; and (b) ask the account holder to enter the nonce using, e.g., the keyboard 192 (or, alternatively, other methods of receiving the nonce may be used, for example, a photoelement as described above). Because the task may execute within the secure zone 150, as described in greater detail with respect to FIG. 2, the keyboard switch 194 may be set such that keyboard 192 input is only accessible by the supervisor 160, which may ensure that even if the operating system 111 is compromised, it is not able to obtain the nonce.

At step 840, the issuing bank task may be passed to the secure zone 150 and executed, e.g., in accordance with the process described previously with respect to FIG. 2, such that this information received from the account holder (e.g., the computing device public key and the nonce) may be sent to the bank.

At step 850, the issuing bank may attest the task running within the secure zone 150 (using any suitable method for remote code attestation). Exemplary implementations of remote code attestation are disclosed in U.S. Provisional Patent Application No. 61/788,326, entitled "Systems, Methods and Apparatuses for Remote Attestation," and filed on Mar. 15, 2013, the entirety of which is hereby incorporated by reference. If the task is confirmed as correct and legitimate, and is confirmed as running on a legitimate secure device, at step 860, the bank may associate the received public key of the device 120 with the specific account holder, encrypt an appropriate indirect subtask using the public key received from the device 120, and send the encrypted indirect subtask to the device 120. Starting from this point, the device 120 may be used in a payment transaction as described above.

It is noted that, using the techniques described in the present disclosure, more than one "virtual ICC" indirect subtask may be associated with the same electronic device 120, and more than one "virtual ICC" indirect subtask may be passed to the secure zone 150 within a combined task 700.

The foregoing disclosure has described an exemplary payment process assuming that all indirect subtasks 730 have been selected and bundled into the combined task 700 before it is sent to the secure zone 150 for execution, e.g., as described with respect to step 205 on FIG. 2. However, for practical reasons, it may be preferable to load the combined task 700 into the secure zone 150 and begin executing the payment process before selecting a particular ICC indirect subtask 730 to use. In other words, the user may wish to progress at least partially through the payment process before selecting a particular virtual payment card.

Accordingly, in certain embodiments, it may be desirable to form the combined task 700 with multiple indirect subtasks 730, e.g., multiple virtual cards, each corresponding to a certain payment account. In such embodiments, there may be a mechanism by which a user may select a particular indirect subtask 730 among those loaded as part of the combined task 700. In one such embodiment, the acquiring bank's subtask 720 (which is provided as part of the merchant's task 710) may be configured to allow the user to select a particular, loaded indirect subtask 730 during execution of the subtask 720.

In other embodiments, it may be preferred that the selection is not delegated to a merchant task 710 or an acquiring bank subtask 720. For example, privacy issues may arise when an acquiring bank's subtask 720 is given access to multiple virtual ICCs. In such embodiments, a special, second type of indirect subtask may be used for "virtual ICC" selection. Such an indirect subtask may be created by any trusted third party—such as, for example, specially designated trusted developers, which may or may not be independent from the banks—and may be stored within the non-secure zone 152 of the client device 120 in advance of any payment transactions. By setting one or more appropriate flags, a "virtual ICC" selection indirect subtask may specify (i) that it can be loaded only by a task 710 or subtask 720 associated with a bank or other financial institution, and/or (ii) that it may provide means for selecting and/or loading only tasks which are marked as "virtual ICC" indirect subtasks.

Further, in this embodiment, to make it possible to distinguish different "virtual ICC" subtasks, each "virtual ICC" subtask may have an additional attribute, such as a name or identifier of the "virtual ICC" subtask. This identifier may be assigned to the indirect subtask 730 by the card-issuing bank and may be formed similarly to traditional, physical card names. For example, such an identifier may include the name of the issuing bank and the type of the card, such as "BestBank MasterCard Gold Credit Card." In certain embodiments, this name may form part of the task itself (in addition to the indirect subtask task code 731 and indirect subtask task data 732), or it may be an additional field in the indirect subtask certificate 739.

After a combined task 700 is loaded to the secure zone 150, e.g., at step 205 (FIG. 2), the supervisor 160 may verify that either (i) only a single "virtual ICC" subtask 730 has been loaded with the task 700, or (ii) more than one "virtual ICC" subtask 730 has been loaded with the task 700, and is further accompanied by a "virtual ICC" selector subtask.

When a user is about to select a "virtual ICC" subtask for payment, a merchant bank subtask may request that the supervisor 160 load either a "virtual ICC" subtask, or a "virtual ICC" selector subtask. If more than one "virtual ICC" subtask has been loaded within the combined task 700, the supervisor 160 may load the "virtual ICC" selector subtask and enable the selector subtask to read the names or identifiers of already loaded "virtual ICC" tasks. The "virtual ICC" selector subtask may provide to the user means for selecting among those names. When a user makes her selection, the corresponding "virtual ICC" subtask may be loaded into the secure processor 162 for completion of the payment.

In the current state of the art, some ICCs possess mutable data storage, including a mutable PIN Try Count field. This field may be used, for example, to limit the number of PIN attempts when the "offline PIN" method of PIN verification is used. The foregoing description of an ICC indirect subtask may not provide for mutable data; accordingly, in some embodiments it may be preferable to limit the ICC indirect subtask to "online PIN" verification, with the PIN verified by the issuing bank.

If ICC mutable data is still required, it may be implemented, for example, by allocating a certain amount of non-volatile memory within the secure zone 150 for such data, which may be released by the supervisor 160 only to the appropriate ICC indirect subtask according to the ICC subtask's digital signature.

Another way by which ICC mutable data may be supported according to the present disclosure is by having the ICC indirect subtask: (1) serialize ICC mutable data; (2) encrypt it with some key specific to the ICC (e.g., a public or symmetric key, which, preferably, is separate from any other ICC key); and (3) send the encrypted ICC data to the non-secure zone 152 for storage. In some embodiments, the ICC subtask may calculate a secure hash of the stored data, which may be stored within the secure zone 150. This hash may be used, for example, to ensure that the operating system 111 is not able to perform replay attacks.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application— such as by using any combination of microprocessors, microcontrollers, field programmable gate arrays (FPGAs), application specific integrated circuits (ASICs), and/or System on a Chip (Soc)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:
1. A computer-implemented method comprising:
receiving, by a computing device, from a first server a subtask comprising data and first executable code, wherein the data of the subtask is encrypted, and wherein the subtask represents a virtual integrated circuit card (ICC), and wherein the first executable code is configured to facilitate secure transactions;

receiving, by the computing device, from a second server a task comprising second executable code that instructs a processor of the computing device to execute the first executable code of the subtask;

storing, by the computing device, in a first non-transitory machine-readable memory of the computing device an encryption key that decrypts the second executable code of the task according to an encryption algorithm of the encryption key;

storing, by the computing device, the subtask representing the virtual ICC in a second non-transitory machine readable memory of the computing device;

decrypting, by the computing device, the data of the subtask representing the virtual ICC;

loading, by the computing device, the second executable code of the task into an instruction memory of the computing device and the decrypted data of the subtask into a data memory of the computing device; and clearing, by the computing device, the task and the subtask from the instruction memory.

2. The method of claim 1, wherein the subtask representing the virtual ICC further comprises a digital signature identifying an entity associated with the first server from which the subtask was received by the computing device.

3. The method according to claim 1, wherein the task further comprises a digital signature identifying an entity associated with the second server from which the task was received by the computing device.

4. The method according to claim 1, wherein a portion of the data memory in which the data is stored is accessible by the subtask and the task.

5. The method of claim 4, further comprising:

retrieving, by the processor, the data of the subtask from the portion of the data memory according to the second executable code of the task.

6. The method of claim 1, further comprising receiving, by the computing device, a verification token.

7. The method of claim 6, wherein the verification token is a one-time PIN entered via a user interface of the computing device.

8. The method of claim 6, wherein the verification token is a nonce.

9. The method of claim 1, further comprising transmitting the task to a third server configured to remotely attest the task.

10. The method according to claim 1, wherein the task comprises one or more fields identifying one or more restrictions on a type of subtask called by the task.

11. A non-transitory computer-readable medium comprising a set of instructions that when executed by a computer processor, cause the computer processor to:

receive from a first server a subtask representing a virtual integrated circuit card (ICC), wherein the subtask representing the virtual ICC comprises data and first executable code to facilitate secure transactions, and wherein the data of the subtask is encrypted;

store the subtask representing the virtual ICC in a first non-transitory machine-readable memory;

decrypt and load into an instruction memory of the processor a task received from a second server, wherein the task comprises second executable code that instructs the processor to load the subtask into the instruction memory, and wherein the instruction memory is a portion of computing hardware operating in a secure mode;

decrypt and load into a data memory the data of the subtask; and clear the task and the subtask from the instruction memory.

12. The non-transitory computer-readable medium of claim 11, wherein the subtask representing the virtual ICC further comprises a digital signature identifying an entity associated with the first server from which the subtask was received.

13. The non-transitory computer-readable medium of claim 11, wherein the task further comprises a digital signature identifying an entity associated with the second server from which the task was received.

14. The non-transitory computer-readable medium of claim 11, wherein the subtask representing the virtual ICC instructs the processor to load the data of the subtask into a portion of the data memory.

15. The non-transitory computer-readable medium of claim 14, wherein the portion of the data memory in which the data of the subtask is loaded is accessible by the subtask and the task.

16. The non-transitory computer-readable medium of claim 15, wherein the task instructs the processor to retrieve the data of the subtask from the portion of the data memory.

17. The non-transitory computer-readable medium of claim 11, wherein when executed by a computer processor, the first executable code of the subtask is configured to generate mutable data to be stored for the virtual ICC.

18. The non-transitory computer-readable medium of claim 17, wherein when executed by the computer processor, the first executable code of the subtask is further configured to:

serialize the mutable data; and encrypt the serialized mutable data with an encryption key.

* * * * *